United States Patent [19]
Dennis et al.

[11] 3,728,672
[45] Apr. 17, 1973

[54] METHOD AND APPARATUS FOR LOGGING THE CHARACTERISTICS OF MATERIALS FORMING THE WALLS OF A BOREHOLE

[75] Inventors: Charles L. Dennis; Joseph Zemanek, Jr., both of Dallas, Tex.

[73] Assignee: Mobil Oil Corporation, New York, N.Y.

[22] Filed: Aug. 9, 1971

[21] Appl. No.: 169,959

[52] U.S. Cl. ..................... 340/15.5 DS, 340/15.5 AC
[51] Int. Cl. ........................... G01v 1/34, G01v 1/40
[58] Field of Search ................. 340/15.5 A, 15.5 AC, 340/15.5 DS

[56] References Cited

UNITED STATES PATENTS

| | | | |
|---|---|---|---|
| 3,369,626 | 2/1968 | Femanek | 181/.5 |
| 3,517,768 | 6/1970 | Straus | 181/.5 |

*Primary Examiner*—Benjamin A. Borchelt
*Assistant Examiner*—N. Moskowitz
*Attorney*—William J. Scherback et al.

[57] ABSTRACT

A method and apparatus for obtaining the log of a borehole employing a transducer assembly which is rotated about and advanced along the axis of a borehole. The transducer assembly includes one or more transmitters of acoustic energy. An excitation pulser is selectively coupled through a relay to the transducer assembly, the relay being energized by surface instrumentation to select the transmitter which is to be operative. Reflections of acoustic energy pulses are converted to electrical reflection signals by the transducer assembly and coupled by signal-enhancing circuitry to the Z-axis of an electron beam display device for intensity modulating the electron beam as it is swept across the face of the display device in accordance with the rotation of the transducer assembly. The signal-enhancing circuitry is selectively operated to nonlinearly change the amplitudes of the reflection signals received from the transducer assembly to either increase or decrease the contrast of the picture of the borehole as displayed on the face of the display device.

22 Claims, 9 Drawing Figures

CHARLES L. DENNIS
JOSEPH ZEMANEK, JR.
INVENTORS

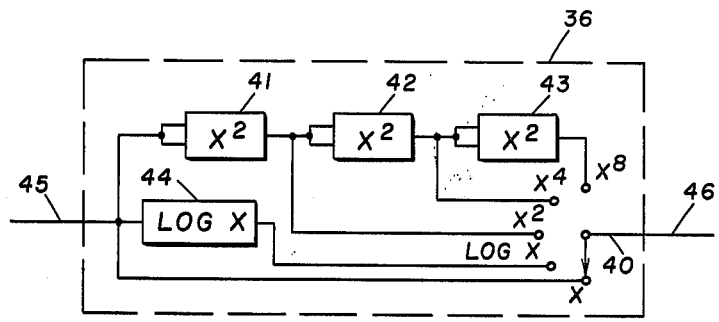
FIG. 2
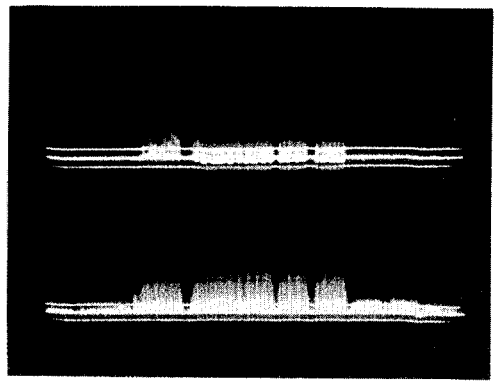
FIG. 4B
FIG. 4A

CHARLES L. DENNIS
JOSEPH ZEMANEK, JR.
INVENTORS

BY George W. Hagen Jr.

ATTORNEY

METHOD AND APPARATUS FOR LOGGING THE CHARACTERISTICS OF MATERIALS FORMING THE WALLS OF A BOREHOLE

BACKGROUND OF THE INVENTION

This invention relates to acoustic logging of boreholes and more particularly to a method and apparatus for determining the characteristics of the material forming the walls of the boreholes by logging the amplitudes of acoustic energy reflections from the walls of the boreholes.

In U.S. Pat. No. 3,369,626 there is disclosed methods of and apparatus for scanning the walls of a borehole with acoustic energy. In one embodiment a transmitter and a receiver of acoustic energy are rotated about the axis of the borehole. The transmitter is cyclically energized to provide a beam of acoustic energy pulses for scanning the walls of the borehole. Reflected acoustic pulses are received by the receiver between transmitted acoustic pulses and are converted to reflection signals for recording on an electron beam display device. A sweep signal is generated each time the acoustic energy beam is rotated through a 360° scanning pattern. Such sweep signal is applied to the horizontal deflection plates of the display device to sweep an electron beam horizontally across the face of the display device. The reflection signals are applied to the Z-axis of the display device to intensity modulate the electron beam as the beam is swept across the face of the display device to provide a picture which is a function of the time or distance from the transmitter and receiver to the wall of the borehole.

In another acoustic logging technique, set forth in U.S. Pat. No. 3,371,313, reflections of acoustic energy pulses received by a transducer being rotated about and advanced along the length of a borehole axis are converted to reflection signals which are applied to the Z-axis of an electron beam display device to intensity modulate the electron beam as a function of the amplitudes of such reflection signals as such beam is swept across the face of the display device.

In both the above-described patents the combination of transducer rotation about the borehole axis with vertical movement of the logging tool along the length of the borehole axis results in a continuous spiral of the borehole wall being scanned. The resulting display is a picture of the characteristics of the material forming the walls of the borehole at different depth points.

SUMMARY OF THE INVENTION

In accordance with the present invention there is provided a new and improved method and apparatus for logging the characteristics of the formations forming the walls of the borehole and displaying such information on a visual display device.

It is a primary object of this invention to provide a method and apparatus for enhancing the contrast of the picture presented on the face of the display device.

Another object of the invention is to provide a method and apparatus for nonlinearly changing the amplitude of the signals representing the reflections of acoustic energy pulses from the walls of a borehole to enhance the contrast presented by a visual display of such reflection signals.

It is a further object of the invention to provide for a method and apparatus for selecting a frequency at which attenuation of the transmitted acoustic energy pulses by borehole mud is minimized and to nonlinearly change the amplitude of the signals representing reflections of such acoustic energy pulses from the borehole walls to enhance the contrast presented by a visual display of such reflection signals for the selected frequency at which the acoustic energy is being transmitted.

Still another object of the invention is the provision for generating signals representative of the amplitudes of acoustic energy reflection signals from the borehole walls raised to the nth power, where $n$ is a positive integer greater than 1.

Yet another object of the invention is the provision for generating signals representative of the logarithm of the acoustic energy reflection signals from the borehole walls.

In accordance with these and other objects, the present invention is directed toward a method and apparatus in which a transducer assembly, acting both as a transmitter and receiver of acoustic energy, is rotated about the axis of a borehole and simultaneously advanced along the length of the borehole axis for logging the characteristics of the material forming the borehole wall. A sawtooth wave beam sweep is produced each time the transducer assembly is rotated 360° about the axis of the borehole. Such sweep is applied to the horizontal deflection plates of an electron beam display device to move the beam horizontally across the face of the display device. Reflected acoustic energy pulses received by the transducer assembly from the borehole walls are used to produce reflection signals representative of the amplitude of the received acoustic energy pulses. These reflection signals are applied through an enhancer circuit to the Z-axis of the display device to intensity modulate the electron beam.

In one aspect of the invention, the enhancer generates signals representative of the amplitudes of said reflection signals raised to the $n$th power, where $n$ is a positive integer greater than 1. Upon application of the enhancer output to the Z-axis of the display device, the electron beam is intensity modulated by the enhancer output to increase the contrast of the picture presented on the face of the display device. Fine fractures or cracks in a very tightly packed material or casing of the borehole wall will be more readily visible on the display device when the contrast has been increased.

In another aspect of the invention, the enhancer generates signals representative of the logarithm of the amplitudes of said reflection signals. Upon application of the enhancer output to the Z-axis of the display device, the electron beam is intensity modulated by said enhancer output to decrease the contrast of the picture on the display device. Gross changes between materials forming the walls of the borehole will be much more readily visible on the display device when the picture contrast has been decreased.

In a further aspect of the present invention, a method and apparatus are provided for enhancing the contrast of a visual display of the characteristic formations of the material forming the walls of a borehole being taken during the logging of a borehole filled with acoustic-energy-attenuating fluid such as mud. A transducer assembly comprises two transmitters for transmitting acoustic energy at two different frequencies.

Acoustic energy from the lower frequency transmitter will be transmitted through the borehole mud to the walls of the borehole and reflected to the receiver portion of the transducer assembly with a lower attenuation than the acoustic energy transmitted from the higher frequency transmitter. However, the picture presented upon intensity modulation of an electron beam display device by the lower frequency acoustic energy reflection signals will be degraded due to the fact that the resolution of the transmitted acoustic energy beam pattern of the higher frequency is greater than the resolution of the beam pattern of the lower frequency. Use of an enhancer circuit to nonlinearly change the amplitudes of the acoustic energy reflection signals is particularly advantageous in logging such a mud-filled borehole. Should the transmitted pulses from the higher frequency transmitter be attenuated by the borehole mud such that intensity modulation of an electron beam display device by reflection signals from the receiver portion of the transducer assembly be insufficient to provide a suitable picture for identifying the characteristics of the material forming the borehole walls, then the lower frequency transmitter may be energized, thus providing reflection signals from the receiver portion of the transducer assembly having greater amplitudes than those signals obtainable from the higher frequency transmitter. These reflection signals are then applied to the enhancer circuit for nonlinearly changing the amplitudes of said reflection signals relative to one another to provide a picture with desirable visual contrast for the lower resolution beam patterns of the lower frequency transmitter.

BRIEF DESCRIPTION OF THE DRAWINGS

FIG. 2 is a circuit schematic of a portion of the apparatus of FIG. 1.

FIGS. 4A and 4B illustrate waveforms useful in understanding the present invention.

DESCRIPTION OF THE PREFERRED EMBODIMENT

Figure 1:
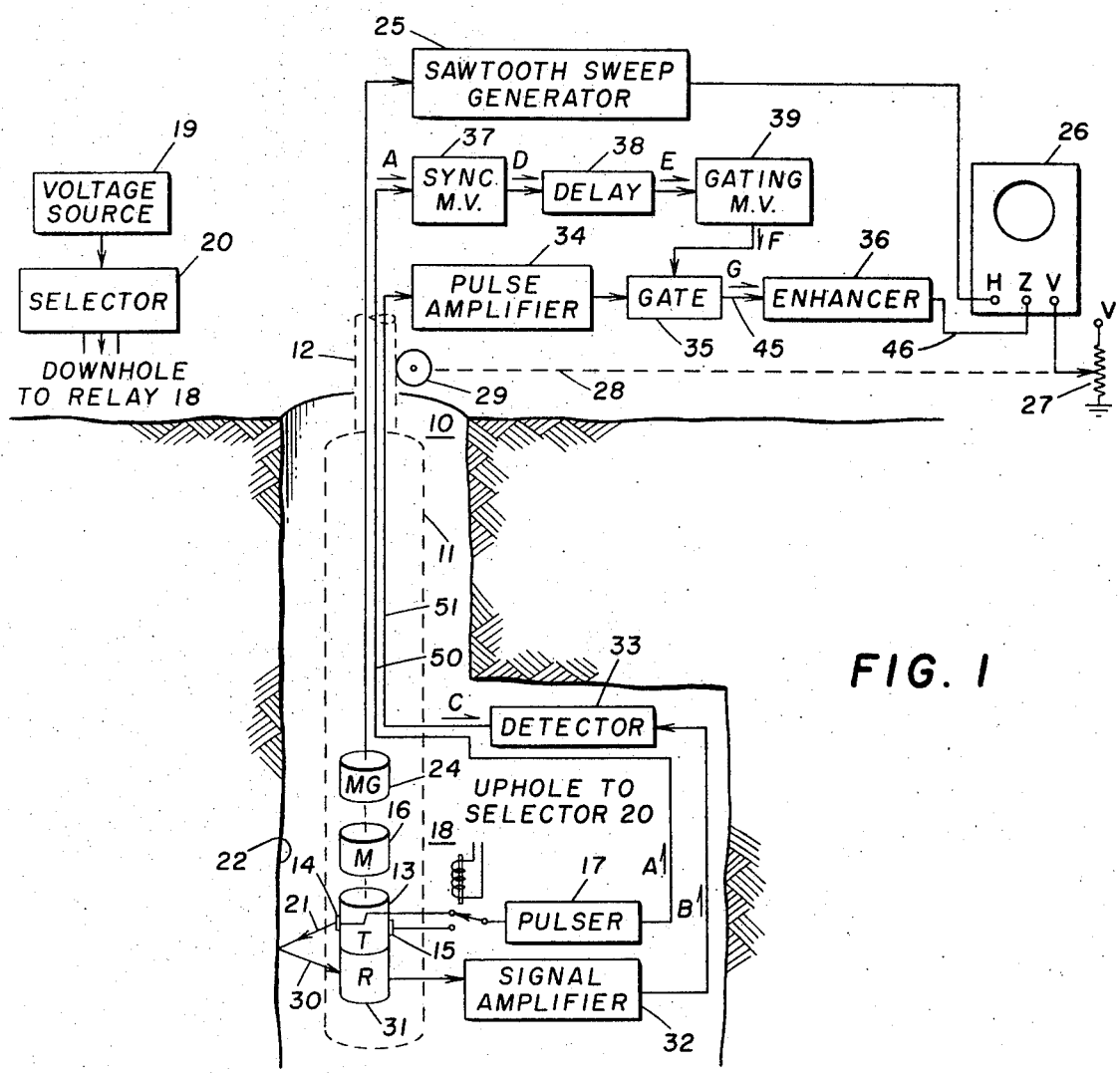
FIG. 1 is a plan view of a preferred embodiment including a diagrammatic representation of a logging tool in a borehole and a schematic block diagram of circuit components.

The signal-enhancing technique, as embodied in the present invention, is particularly adapted for use with borehole logging apparatus of the type illustrated in FIG. 1. For the purpose of illustrating the type of logging operation in which the signal-enhancing technique of the present invention best operates, a general description of the logging apparatus shown in FIG. 1 will be first presented, following which details of the circuitry shown in FIG. 2 for performing the signal-enhancement operation will be described. Thereafter, a more detailed description of the operation of the logging system of the present invention will be made.

Referring now to FIG. 1, there is illustrated one embodiment of a logging system for carrying out logging operations in a borehole 10. A borehole logging tool 11 is lowered into borehole 10 by means of a logging cable 12. Logging tool 11 comprises a transducer assembly 13 which acts as both a transmitter and receiver of acoustic energy. The beam of high frequency acoustic energy is rotated about the borehole axis to circularly scan the walls of the borehole. Such rotation is effected by means of motor 16. While it is understood that transducer assembly 13 comprises separate transmitter and receiver portions, a single transducer acting both as transmitter and receiver may be utilized. The transmitter portion of transducer assembly 13 consists of two transmitters 14 and 15 which are rotated about the borehole axis by means of motor 16. Pulser 17 is selectively applied to transmitters 14 and 15 by way of relay 18. Voltage is applied from voltage source 19 to relay 18 by way of selector 20. Selector 20 is a switch located uphole by which the polarity of the voltage to be applied to relay 18 is selected. A voltage polarity in one direction energizes relay 18 to connect the output of pulser 17 to transmitter 14. A polarity in the opposite direction energizes relay 18 to couple the output of pulser 17 to transducer 15. Hence, only one transmitter, either transmitter 14 or transmitter 15, will be operative at any given time, the frequency of the acoustic energy transmitted by way of beam path 21 toward the wall 22 of borehole 10 being determined by the selector switch 20 whose setting determines which transmitter is coupled to pulser 17.

Logging tool 11 also includes a magnetometer 24, mounted for rotation within the logging tool 11 about the borehole axis, which produces an output pulse each time magnetic north is detected by said magnetometer during rotation about the borehole axis. Such magnetometer output pulse is applied uphole to sawtooth sweep generator 25 which provides a horizontal sweep signal to the horizontal deflection plates of an electron beam display device 26 for horizontally driving an electron beam across the face of display device 26.

Each horizontal sweep of the electron beam across the display device 26 is displaced vertically from the start of the sweep to the end of the sweep in proportion to the vertical movement of the logging tool 11 within the borehole 10. Such displacement is provided by means of a potentiometer 27 which is coupled by electromechanical linkage 28 to a sheave 29 over which logging cable 12 passes. Vertical advancement of logging cable 12 along the borehole axis rotates sheave 29, such rotation causing electromechanical linkage 28 to vary the location of the wiper arm on potentiometer 27, thereby applying to the vertical deflection plates of display device 26 a voltage which is proportional to the depth of the logging tool within the borehole. The resulting picture displayed on display device 26 is a series of side-by-side substantially horizontal beams, the start of each beam trace located at the vertical position on the face of the display device where the preceding beam trace terminated.

Reflected acoustic energy pulses 30 are received by a receiver portion 31 of transducer assembly 13, and signals representative of such reflections are applied to the Z-axis of display device 26 by way of a signal amplifier 32 and detector 33, located downhole, and a pulse amplifier 34, gate 35, and enhancer 36 located on the surface of the earth. Such input to the Z-input terminal of display device 26 serves to intensity modulate the electron beam in accordance with the amplitudes of the reflection signals.

Pulser 17 also provides an output to a sync multivibrator 37, delay 38, and gating multivibrator 39. The output of gating multivibrator 39 is an indication of the time period between transmitted acoustic energy pulses and during which reflected acoustic energy pulses are expected to be received at receiver 31, such output being applied to gate 35 to allow reflection signals to pass from pulse amplifier 34 through gate 35 and enhancer 36 to the modulating input of display device 26.

Referring now to FIG. 2 there is shown the circuit diagram of enhancer 36. Enhancer 36 comprises a switch 40, squaring circuits 41, 42, and 43, and a logarithm circuit 44. Each squaring circuit may, for example, consist of a multiplier with two inputs connected in parallel to provide a signal-squaring response. Input to enhancer 36 is provided by way of a channel 45 leading from the output of gate 35. An output channel 46 leads to the Z-axis input of display device 26. Switch 40 is a five-position switch with the five positions designated, X, $X^2$, $X^4$, $X^8$, and log X. Position X is coupled directly to input channel 45. Positions $X^2$, $X^4$, $X^8$, and log X are coupled directly to the outputs of squaring circuits 41, 42 and 43 and logarithm circuit 44, respectively.

Setting of switch 40 determines the operation which is performed by enhancer 36 upon the reflection signal appearing on input channel 45. For example, for switch setting on position X, the reflection signal input to the enhancer 36 passes from input channel 45 directly to output channel 46. For this setting, the enhancer is effectively short-circuited and the reflection signal passes from gate 35 directly to the Z-axis input of display device 26.

For switch setting on position $X^2$, the reflection signal on channel 45 is operated upon by squaring circuit 41 to provide an output signal on channel 46 which is a representation of the reflection signal raised to the second power. Assuming, for purposes of explanation, that the reflection signal on input channel 45 is represented by the legend Y, then the signal generated by enhancer 36 and appearing on output channel 46 can be represented by the legend $Y^2$.

For a switch setting on position $X^4$, the reflection signal on channel 45 is operated upon by squaring circuits 41 and 42 to provide an output signal on a channel 46 which is a representation of the reflection signal raised to the fourth power. Assuming again, for example, that the reflection signal on input channel 45 is represented by the legend Y, then the signal generated by enhancer 36 on output channel 46 can be represented by the legend $Y^4$.

Similarly, switch setting on position $X^8$ indicates that the reflection signal is operated upon successively by squaring circuits 41, 42, and 43 to thereby provide an output signal on channel 46 representative of the reflection signal raised to the eighth power. Likewise, for example, a reflection signal designated by the legend Y will be operated upon by enhancer 36 to generate an output signal represented by the legend $Y^8$.

Switch setting on position log X indicates that the reflection signal on channel 45 is applied to logarithm circuit 44 which provides an output signal on channel 46 representative of the logarithm of such reflection signal. Further, for example, logarithm circuit 44 operates upon a reflection signal, designated by the legend Y, to generate an output signal on channel 46 represented by the legend log Y.

Having briefly described the present invention in accordance with the structure set forth in FIGS. 1 and 2, a more detailed description of the operation of the logging system of the present invention will now be made. Motor 16, supplied with power from voltage source 19 (connections not shown), rotates the transducer assembly 13 and magnetometer 24 within the logging tool 11 at a speed of, for example, three revolutions per second. Magnetometer 24, sensing magnetic north once for every revolution, thereby provides an output pulse every one-third second to sawtooth sweep generator 25 which in turn provides a sweep signal each one-third second to the horizontal deflection plates of display device 26 to horizontally drive the electron beam across the face of display device 26. Pulser 17, also provided with power from voltage source 19 (connections not shown), provides a series of excitation pulses to either transmitter 14 or transmitter 15. Selector 20 may be set to apply a voltage of one polarity sufficient to energize relay 18 to couple excitation pulses from pulser 17 to transmitter 14 or set to a voltage of the opposite polarity sufficient to energize relay 18 to couple excitation pulses from pulser 17 to transmitter 15. Either transmitter 14 or transmitter 15, upon application of excitation pulses, provides acoustic energy pulses directed in a beam 21 toward the walls 22 of borehole 10. Pulser 17 may, for example, produce in the order of 2,000 excitation pulses per second. Thereupon, transmitter 14, for example, will produce an acoustic energy burst rate in the order of 2,000 bursts per second. A suitable frequency of the pulses of each acoustic energy burst may be, for example, 2 megahertz. Each time pulser 17 generates an excitation pulse, it also generates a sync pulse as indicated by waveform A in FIG. 3 which is transmitted uphole by means of conductor 50 to the input of sync multivibrator 37 whose operation will be described later.

Figure 3:
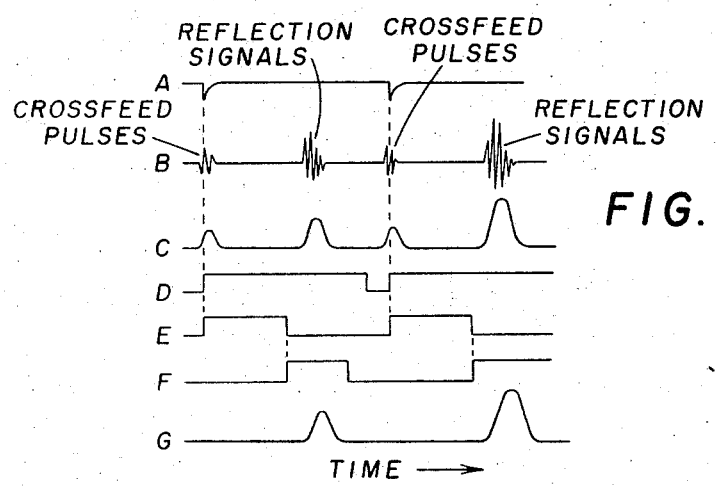
FIG. 3 is a series of waveforms representative of signals appearing at the indicated points in the circuit of FIG. 1.

Due to varying reflection characteristics of material forming the walls of the borehole, acoustic energy reflection pulses will be of varying amplitudes. Receiver 31 converts the reflected pulses to representative electrical reflection signals as indicated by waveform B (FIG. 3).

Ordinary logging cables are not suitable for transmission of high frequency signals, such as 2 megahertz, to the surface; therefore, after being amplified by signal amplifier 32, the reflection signals are applied to detector 33 which generates a lower frequency signal in the form of the envelope of the reflection signals. Such lower frequency signals, preferably in the range of 20–50 kilohertz, can be transmitted to the surface over ordinary logging cable without appreciable signal loss. The output of detector 33, represented by waveform C (FIG. 3), is applied to the input of pulse amplifier 34 by means of conductor 51.

When pulser 17 generates an excitation pulse, a portion of this pulse crossfeeds into receiver 31. Also, when a sync pulse, waveform A, is generated by pulser 17 and sent uphole via conductor 50, a portion of the pulse crossfeeds into receiver conductor 51. To prevent these crossfeed signals from intensity modulating the electron beam of display device 26, gate 35 is open only during that portion of time during which reflected pulses are expected to be received from the walls of the borehole. Each time a sync pulse, waveform A, is received by sync multivibrator 37, it triggers into its unstable state for an output as shown by waveform D (FIG. 3) for a period of time almost as long as the time period between transmitted acoustic pulses. At the same time that the output waveform D of sync multivibrator 37 goes positive, a delay monostable multivibrator 38 is triggered by the positive-going leading edge of waveform D into its unstable state for a period of time, as indicated by waveform E (FIG. 3), ending just prior to the anticipated arrival time of a reflected pulse at receiver 31. As the trailing edge of waveform E of delay multivibrator 38 goes negative, a gating monostable multivibrator 39 is triggered into its unstable state to generate a positive-going output waveform F (FIG. 3) to control passage of reflection signals through gate 35. Upon the occurrence of waveform F, gating multivibrator 39 provides a signal to gate 35 to allow passage therethrough of only those signals representative of reflected pulses. Therefore, only the envelopes of the reflection signals, as indicated by waveform G (FIG. 3), pass through gate 35 to enhancer 36.

As previously described, enhancer 36 functions to nonlinearly modify the amplitudes of the envelope peaks of the reflection signals relative to one another, waveform G (FIG. 3), applied to input channel 45. For one series of settings of switch 40, designated as $X^2$, $X^4$, $X^8$, the incoming signal is raised to the $n$th power, where $n$ is, respectively, 2, 4, and 8. In the drawing of FIG. 2, only three squaring circuits 41, 42, and 43 have been shown. However, it may be appreciated that any number of cascaded squaring circuits may be used to achieve the signal enhancement factor that is desired.

Figure 5A:
FIGS. 5A–5D are displays obtained from the embodiment of the present invention.
Figure 5B:
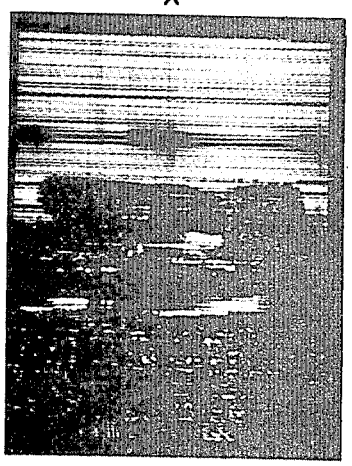
Figure 5C:
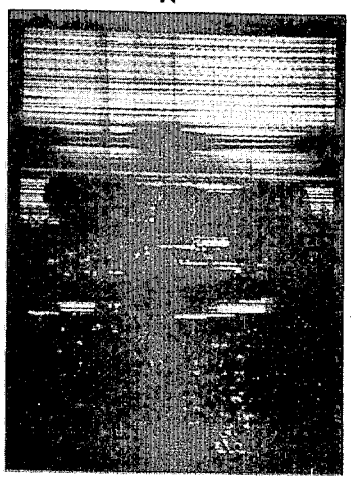

For a more complete understanding of enhancer circuit 36, reference may now be had to FIG. 2 taken in conjunction with FIGS. 4A, 4B, and 5A–5D. FIG. 4A represents a reflection signal received during logging operations for one revolution of the transducer assembly 13 but which has not been operated upon by enhancer circuit 36. Upon applying the signal represented by FIG. 4A to enhancer 36 and selecting a switch setting of $X^4$, for example, enhancer 36 provides an output signal on channel 46 which is represented by the waveform shown in FIG. 4B, such enhancer output signal being, in effect, the reflection signals raised to the fourth power. The signal represented by the waveform of FIG. 4B, when applied to the Z-input of display device 26, will intensity modulate the electron beam to provide a visual display with greater contrast than that which would have been presented on the display screen by modulation of the electron beam by the signal of FIG. 4A. Such an increase in contrast may be seen with reference to FIGS. 5A and 5C. FIG. 5A represents the picture on the display screen of display device 26 when the reflection signals have not been operated upon by enhancer 36. That is, the reflection signals appearing on line 45 have been coupled, by a setting of switch 40 on position X, directly to output channel 46 of enhancer 36 and have been applied directly to the Z-axis of the display device 26. FIG. 5C represents the picture on the display device 26 obtained when the reflection signals have been raised to the fourth power by the successive operations of squaring circuits 41 and 42, respectively, of enhancer 36.

FIG. 5B represents reflection signals raised to the second power. It can be observed that the contrast in the picture of FIG. 5B is greater than the contrast in the picture of FIG. 5A. It can be further observed that the contrast in the picture of FIG. 5C is greater still than that in the picture of FIG. 5B. The effect, therefore, of nonlinearly increasing the amplitudes of the reflection signals relative to one another by raising such signals to the $n$th power, where $n$ is a positive integer greater than 1, effectively makes gross increases in the contrast presented on the face of the display device as the value of $n$ increases.

Figure 5D:
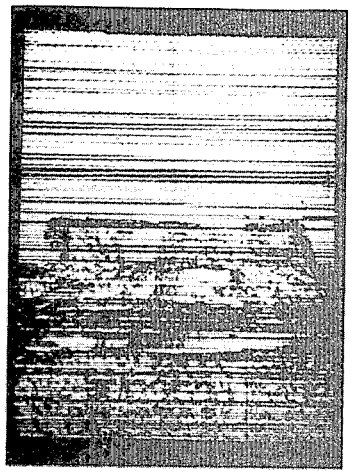

Such an operation for improving contrast by raising reflection signals to the nth power permits the observation of very small hairline fractures where the formation around the wall of the borehole is comprised of materials which are very hard. However, such a contrast-improving operation would not be advantageous under all logging conditions. Under certain type operating conditions, it would be desirable to decrease display contrast. Such an operation would be of advantage in logging where the materials forming the borehole walls are relatively soft or in logging a borehole which has been cased and the logging operation is being performed to observe cracks and holes in the casing itself. Such an operation can be performed by modulating the electron beam with a signal in the form of the logarithm of the reflection signals. By setting switch 40 on position log X, logarithm circuit 44 provides an output on channel 46 in the form of the logarithm of the reflection signals. FIG. 5D represents the output of enhancer 36 wherein the reflection signals of FIG. 5A have been operated upon by logarithm circuit 44. It can be observed that the contrast has been decreased.

Any conventional multiplier may be used for elements 41, 42, and 43 such as those manufactured and sold by Burr-Brown Research Corp. of Phoenix, Ariz., under Part No. 4098/25. Likewise, any conventional logarithm circuit use may be used for element 44 such as that manufactured and sold by Burr-Brown Research Corp. under Part No. 1664/16.

When logging under conditions wherein the borehole is filled with clean oil or water, a 2-megahertz acoustic energy pulse, for example, transmitted by a transducer having a ½-inch-diameter aperture, provides a picture of the borehole wall such that a 1/32-inch crack can be identified in the borehole wall. However, in many logging operations the borehole is filled with heavy mud. Such mud can attenuate the acoustical energy being transmitted through the mud and reflected off the borehole walls. In order to minimize the attenuating feature of the borehole mud, the wave length of the transmitted acoustic energy is increased. As frequency is inversely proportional to wave length, the frequency must therefore be decreased. Such a reduction in frequency increases the width of the beam pattern to such an extent that transducer resolution is decreased. Such a degradation of transducer resolution would cause a corresponding degradation in the quality of the picture on the display device. Use of enhancer circuit 36 to perform signal enhancement operations is particularly advantageous in a logging operation of the foregoing-described type to compensate for such a degradation in beam resolution to enhance the contrast in the picture presented on the face of the display device, such compensation being the operation of nonlinearly changing the amplitudes of the reflection signals relative to one another to intensity modulate the electron beam.

We claim:

1. A system for logging characteristics of material forming the walls of a borehole, comprising:
   a. a transducer assembly including transmitting means for producing acoustic energy pulses and receiving means for producing signals representative of reflections of said acoustic pulses from the walls of said borehole,
   b. means for rotating said transducer assembly about the borehole axis,
   c. means for advancing said transducer assembly along the axis of said borehole,
   d. means for displaying said reflection signals such that amplitude variations in said signals are contrasted visually, and
   e. means for nonlinearly changing the amplitudes of said reflection signals relative to one another to enhance the contrast presented by said display means.

2. The system of claim 1 wherein:
said signal amplitude changing means generates signals representative of the amplitudes of said reflection signals raised to the $n$th power, where $n$ is a positive integer greater than 1.

3. The system of claim 1 wherein:
said signal amplitude changing means generates signals representative of the logarithm of the amplitudes of said reflection signals.

4. The system of claim 1 wherein the transmitting means of said transducer assembly includes:
   a. means for producing acoustic pulses of at least two frequencies, and
   b. switching means for selecting the frequency at which said transmitting means operates.

5. The system of claim 1 further including:
an envelope detector responsive to said reflection signals for producing envelope signals representative of the envelope of said reflection signals, said envelope signals then being displayed by said display means and operated upon by said nonlinear amplitude changing means.

6. A system for displaying data, said data being obtained from a borehole wherein acoustic energy pulses are transmitted by a transducer assembly located in and rotated about the axis of the borehole and reflections of such acoustic energy pulses from formations surrounding the borehole are received by said transducer, comprising:
   a. means for displaying signals representative of the reflections received by said transducer assembly so that amplitude variations in said signals can be contrasted visually, and
   b. means for nonlinearly changing the amplitudes of said signals relative to one another to enhance the visual contrast presented by said signals.

7. The system of claim 6 wherein:
said amplitude changing means generates signals representative of the amplitude of said received reflections raised to the $n$th power, where $n$ is a positive integer greater than one.

8. The system of claim 6 wherein:
said amplitude changing means generates signals representative of the logarithm of the amplitude of said received reflections.

9. A system for displaying borehole data on an electron beam display device, said data being obtained from scanning the walls of a borehole at a plurality of depths wherein a beam of high frequency acoustic energy is rotated about the borehole axis and reflection signals are produced in response to received reflections of acoustic energy from the borehole walls, said system comprising:
   a. means for sweeping an electron beam across the face of said electron beam display device in response to the rotation of said high frequency acoustic energy about said borehole axis,
   b. means responsive to said reflection signals for modulating said electron beam to present a visual display of the characteristics of the material forming the walls of said borehole, and
   c. means for nonlinearly changing the amplitudes of said reflection signals relative to one another to enhance the contrast on the visual display presented by said signals.

10. The system of claim 9 wherein:
said amplitude changing means generates signals representative of the amplitudes of said reflection signals raised to the $n$th power, where $n$ is a positive integer greater than 1.

11. The system of claim 9 wherein:
said amplitude changing means generates signals representative of the logarithm of the amplitudes of said reflection signals.

12. A method of displaying data, said data being obtained from a borehole wherein acoustic energy pulses are transmitted by a transducer assembly located in and rotated about the axis of the borehole and reflections of such acoustic energy pulses from formations surrounding the borehole are received by said transducer, comprising:
   a. visually displaying signals representative of the reflections received by said transducer assembly so that amplitude variations in said signals can be contrasted visually, and
   b. nonlinearly changing the amplitudes of said signals relative to one another to enhance the visual contrast presented by said signals.

13. The method of claim 12 wherein said amplitude changing step includes:
generating signals representative of the amplitude of said received reflections raised to the $n$th power, where $n$ is a positive integer greater than 1.

14. The method of claim 12 wherein said amplitude changing step includes:
generating signals representative of logarithm of the amplitude of said received reflections.

15. A method of displaying borehole data on an electron beam display device, said data being obtained from scanning the walls of a borehole at a plurality of depths wherein a beam of high frequency acoustic energy is rotated about the borehole axis and reflection signals are produced in response to received reflections of acoustic energy from the borehole walls, said method comprising the steps of:

a. sweeping an electron beam across the face of said electron beam display device in response to the rotation of said high frequency acoustic energy about said borehole axis, b. intensity modulating said electron beam with said reflection signals to present a visual display of the characteristics of the material forming the walls of said borehole, and c. nonlinearly changing the amplitudes of said reflection signals relative to one another to enhance the contrast on the visual display presented by said signals.

16. The method of claim 15 wherein said amplitude changing step includes:

generating signals representative of the amplitudes of said signals raised to the $n$th power, where $n$ is a positive integer greater than 1.

17. The method of claim 15 wherein said amplitude changing step includes:

generating signals representative of the logarithm of the amplitudes of said signals.

18. A method of logging a borehole, comprising:

a. rotating about the axis of a borehole a transducer assembly for transmitting and receiving acoustic energy pulses, b. advancing said transducer assembly along the length of said borehole axis, c. generating first signals representative of reflections of said acoustic energy pulses from the walls of said borehole, d. nonlinearly changing the amplitudes of said first signals relative to one another to provide for second signals, and e. displaying said second signals such that amplitude variations in said second signals are contrasted visually.

19. The method of claim 18 wherein said amplitude changing step includes:

generating second signals representative of the amplitudes of said first signals raised to the $n$th power, where $n$ is a positive integer greater than 1.

20. The method of claim 18 wherein said amplitude changing step includes:

generating second signals representative of the logarithm of the amplitudes of said first signals.

21. The method of claim 18 further including the step of:

a. providing for acoustic energy pulses of at least two frequencies, and b. selecting the frequency at which said transducer assembly operates.

22. The method of claim 18 wherein said first signal generating step further includes the step of:

producing envelope signals representative of the envelope of said reflection signals.

* * * * *